(12) United States Patent
Wurfel et al.

(10) Patent No.: US 7,883,140 B2
(45) Date of Patent: Feb. 8, 2011

(54) AIR-DIRECTING COMPONENT AND BODY FRONT END OF A MOTOR VEHICLE

(75) Inventors: Manfred Wurfel, Leonberg (DE); Erwin Wachter, Ellingen-Stopfenheim (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 6 days.

(21) Appl. No.: 12/423,860

(22) Filed: Apr. 15, 2009

(65) Prior Publication Data

US 2009/0261619 A1 Oct. 22, 2009

(30) Foreign Application Priority Data

Apr. 22, 2008 (DE) .................... 10 2008 020 082

(51) Int. Cl.
*B62D 25/08* (2006.01)
(52) U.S. Cl. .................... 296/191; 296/180.1; 403/353; 403/374.1
(58) Field of Classification Search ................. 403/353, 403/374.1; 296/191, 180.1
See application file for complete search history.

(56) References Cited

U.S. PATENT DOCUMENTS

| | | | | |
|---|---|---|---|---|
| 3,813,735 A | * | 6/1974 | Thiermann | 24/613 |
| 4,193,621 A | * | 3/1980 | Peichl et al. | 293/142 |
| 4,966,245 A | * | 10/1990 | Pfister | 180/68.6 |
| 5,098,765 A | * | 3/1992 | Bien | 428/134 |
| 5,143,331 A | * | 9/1992 | Robert | 248/27.1 |
| 5,420,762 A | * | 5/1995 | Lewis | 362/549 |
| 6,929,313 B2 | * | 8/2005 | Fries et al. | 296/193.05 |
| 6,932,397 B2 | * | 8/2005 | Svendsen et al. | 293/117 |
| 6,997,496 B2 | * | 2/2006 | Danev | 296/29 |
| 7,144,059 B2 | * | 12/2006 | Pfister et al. | 296/29 |
| 2004/0135383 A1 | | 7/2004 | Ariga et al. | |
| 2009/0230589 A1 | * | 9/2009 | Rossi et al. | 264/292 |

FOREIGN PATENT DOCUMENTS

| | | |
|---|---|---|
| JP | 61109903 | 7/1986 |
| JP | 62095967 | 6/1987 |

* cited by examiner

*Primary Examiner*—Dennis H Pedder
(74) *Attorney, Agent, or Firm*—Gerald E. Hespos; Michael J. Porco

(57) ABSTRACT

An air-directing component (10) of a motor vehicle has an installation surface (18) that bears against an outer side (20) of the front end (12) of the motor vehicle. Hook-shaped projections (14.1, 14.2) protrude from the installation surface (18) and have dimensions which are matched to dimensions of the recesses (16.1, 16.2) in the front end (12) in such a manner that be pushed into recesses (16.1, 16.2) of a body front end (12) of the motor vehicle. Each projection (14.1, 14.2) reaches through the recess (16.1, 16.2) and engages behind an edge (26) of the recess (16.1, 16.2) on an inner side (28) of the front end (12). The shape and arrangement of the projections (14.1, 14.2) permit the projections (14.1, 14.2) to be pushed transversely with respect to a longitudinal axis of the motor vehicle into the recesses (16.1, 16.2).

10 Claims, 3 Drawing Sheets

AIR-DIRECTING COMPONENT AND BODY FRONT END OF A MOTOR VEHICLE

CROSS REFERENCE TO RELATED APPLICATION

This application claims priority under 35 USC 119 on German Patent Application No. 10 2008 020082.4 filed on Apr. 22, 2008, the entire disclosure of which is incorporated herein by reference

BACKGROUND OF THE INVENTION

1. Field of the Invention

The invention relates to an air-directing component of a motor vehicle, with hook-shaped projections that are configured to be pushed into recesses of a body front end of the motor vehicle. The invention furthermore relates to a body front end that is designed for the installation of an air-directing component and has recesses that are configured to receive projections of the air-directing component. In one configuration, the air-directing component is a front spoiler that is fastened to a bumper covering on the front part of the motor vehicle body.

2. Description of the Related Art

US 2004/0135383 discloses an air-directing component and a body front end of a motor vehicle. The air-directing component shown in US 2004/0135383 is a front spoiler and has guide and fastening regions that are received and held by a spoiler mount groove in the front bumper. The spoiler has a fitting base section that fits in the groove in a form-fitting manner. Both the groove and the fitting base section run transverse to the direction of travel and have conical cross sections that limit pushing of the spoiler into the groove counter to the direction of travel. The spoiler also has fastening regions that point rearward in the longitudinal direction of the vehicle and engage deeper into the groove. Each fastening region supports a resilient latch that reaches through the groove and engages behind an upper inner edge of the groove to prevent the spoiler from being pulled out in the longitudinal direction of the vehicle. Additional fastening elements, such as bushes and/or clips, reach through overlapping holes in the fastening regions of the spoiler and in a lower part of the body front end and hold the spoiler and body front end together.

The spoiler is pushed into the groove during a first step of an installation process so that the resilient latches temporarily fix the spoiler in an installation position. The fastening elements then are inserted during a second step of the installation for further fastening the spoiler.

An object of the invention is to enable installation and removal of an air-directing component in a simple manner, thereby saving time and cost. An additional object is to enable installation and removal of an air directing component without using tools.

SUMMARY OF THE INVENTION

The invention relates to an air-directing component with an installation surface and projections that protrude from the installation surface. The installation surface can be placed on an outer side of a front end of a vehicle so that the projections that protrude from the installation surface engage in recesses at the front end of the vehicle. The air-directing component subsequently is displaced transversely with respect to a longitudinal axis of the motor vehicle. As a result, the projections are displaced in the recesses to a fitted state in which each projection reaches through the recess and engages behind an edge of the recess on an inner side of the front end. The inner side is opposite the installation surface. Installation therefore takes place by a single transverse displacement of the air-directing component that has been placed suitably onto the outer side of the body front end without subsequently using fastening elements, such as rivets, screws or clips.

As a result, the number of required parts are reduced. Additionally, installation movements, such as manual actions by a fitter or mechanical working steps by a mechanical robot are reduced. Furthermore, the air-directing component can be removed easily by a removal movement in the opposite direction to achieve a great advantage with a corresponding increased saving of time in the event of repair.

The features mentioned above and those explained below can be used in the stated combination and also in different combinations or on their own without departing from the scope of the invention.

Exemplary embodiments of the invention are illustrated in the drawings and are explained in more detail in the description below.

DETAILED DESCRIPTION OF THE PREFERRED EMBODIMENT

Figure 1:
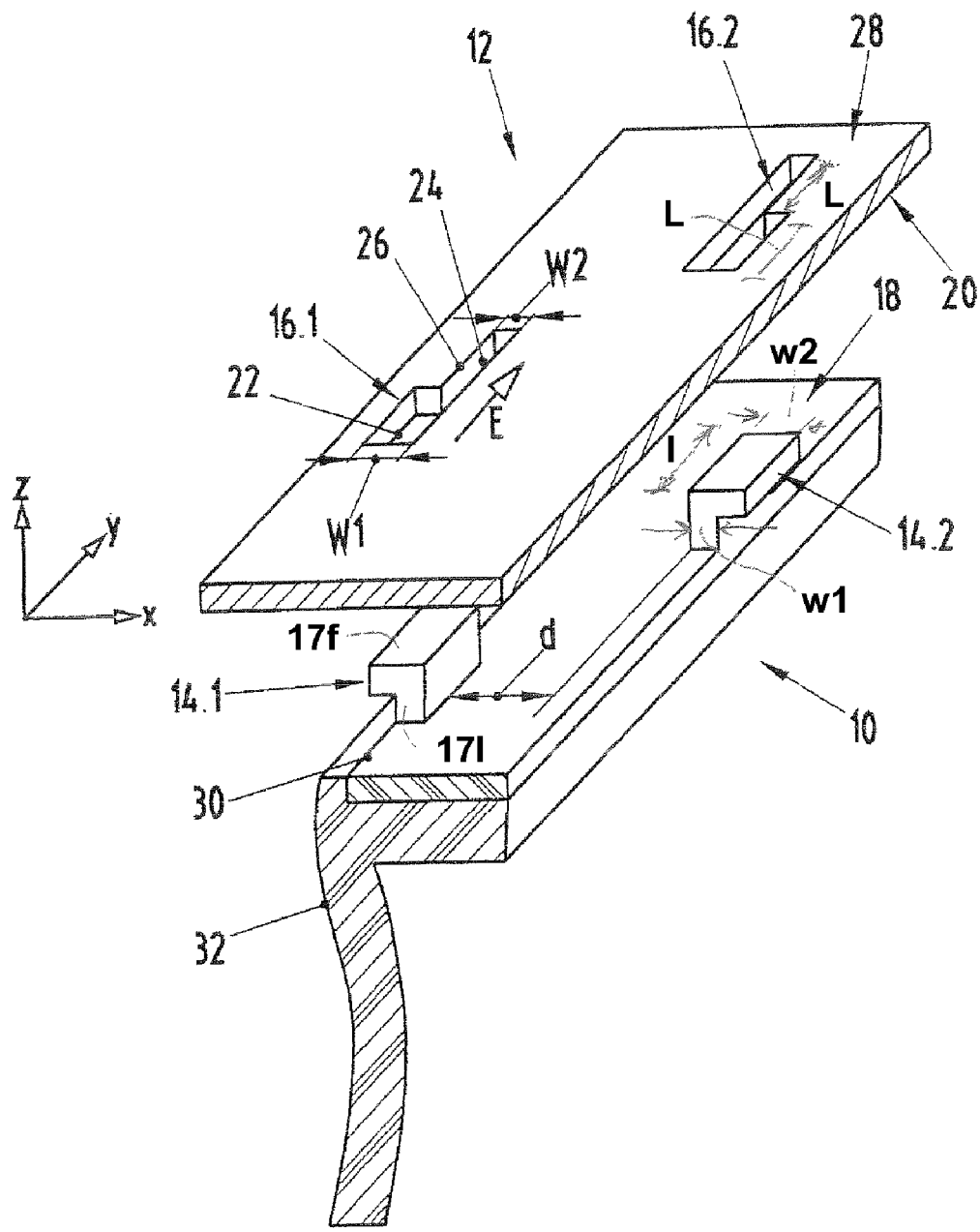
FIG. 1 is a perspective view of regions of an air-directing component and a front end of a motor vehicle in a non-fitted state.

An air-directing component in accordance with the invention is identified generally by the numeral 10 in FIG. 1. The air directing component 10 is illustrated in proximity to a central region of a body front end 12 of a motor vehicle to which the air-directing component 10 is to be fastened. The x direction is parallel to the longitudinal axis of the vehicle and points toward the rear of the motor vehicle. The y direction points toward the right side of the motor vehicle, and the z direction is parallel to the vertical axis of the motor vehicle and points away from the roadway. Such an orientation of the air-directing component 10 is characteristic of a front spoiler.

The air-directing component 10 has hook-shaped projections 14.1, 14.2 that are configured and disposed to be pushed in the z direction into recesses 16.1, 16.2 in the body front end 12. The air-directing component 10 has an installation surface 18 that is configured to bear against an outer side 20 of the front end 12 in the fitted state of the air-directing component 10. The projections 14.1, 14.2 protrude out of the installation surface 18. More particularly, each projection 14.1, 14.2 has a support leg 17*l* that extends out from the installation surface 18 and a holding flange 17*f* that extends substantially parallel to the installation surface 18 at the end of the support leg 17*l* remote from the installation surface 18. Each of the projections 14.1, 14.2 has a length l along the y direction, which is transverse to the longitudinal axis of the vehicle. Additionally, the support leg 17*l* has a thickness w1 in the x direction, whereas the holding flange 17*f* has a width w2 in the x direction.

The body front end 12 is designed for installation of the air-directing component 10. More particularly, the recesses 16.1, 16.2 are disposed and configured to receive the projections 14.1, 14.2 of the air-directing component 10. In one configuration, the body front end 12 is a bumper covering of the motor vehicle.

Each recess 16.1, 16.2 has a entry region 22 with a large clear width W1 in the x direction and a locking region 24 with a small clear width W2 in the x direction. Additionally, the entry region 22 and the locking region 24 each have a length L in the y direction. The large clear width W1 is slightly greater than the width w1 of the locking flange 17f of the projections 14.1, 14.2 of the air-directing component 10 and the length L of the entry region 22 is slightly longer than the length of each projection 14.1, 14.2. Thus, the entry regions 22 can receive the projections 14.1, 14.2 when the installation surface 18 of the air-directing component 10 is placed against the outer side 20 of the front end 12. Thus, each projection 14.1, 14.2 can be pushed in the z direction into and through the corresponding recess 16.1, 16.2. The small clear width W2 is approximately equal to the thickness of the support leg 17l and less than the width w2 of the locking flange 17f of the projections 14.1, 14.2 of the air-directing component 10. Thus, the projections 14.1, 14.2 can be pushed from the entry region 22 into the locking region 24 along a pushing-in direction E, with the projections 14.1, 14.2 engaging behind an edge 26 of the second region 24 of the recess 16.1, 16.2 in a form-fitting manner in the pushed-in state.

The entry and locking regions 22 and 24 are arranged next to one another transversely with respect to the longitudinal axis of the vehicle, with a transition from the first clear width W1 to the second clear width W2 taking place in a single step. An alternate configuration provides a transition from the first clear width W1 to the second clear width W2 in the form of a ramp at an acute angle.

The air-directing component 10 is fastened to the front end 12 by inserting the projections 14.1, 14.2 into the entry regions 22 of the receptacles 16.1, 16.2 so that the installation surface 18 is placed onto the outer surface 20 of the front end 12. The air-directing component 10 then is displaced to a stop in the pushing-in direction E, which substantially corresponds to the transverse direction y of the vehicle. The projections and receptacles can be matched to one another so that the interlocking takes place gradually, virtually in the manner of a zip fastener, if the air-directing component 10 is long. Thus, the worker advantageously does not have to hold the region that already has been interlocked.

Latching means are arranged in lateral end regions of the air-directing component 10 and the front end 12 to prevent unintended displacement, as explained in more detail below with reference to FIGS. 2 and 3.

The dimensions of the projections 14.1, 14.2 are matched to dimensions of the recesses 16.1, 16.2 of the front end 12 so that, in the fitted state, each projection 14.1, 14.2 reaches through the recess 16.1, 16.2 and engages behind the edge 26 of the recess 16.1, 16.2 on an inner side of the front end 12 that is opposite the installation surface 18. Furthermore, the shape and arrangement of the projections 14.1, 14.2 are matched to the shape and arrangement of the recesses 16.1, 16.2 so that the projections can be pushed transverse to the longitudinal axis of the motor vehicle into the recesses 16.1, 16.2.

In the configuration illustrated in FIG. 1, the projection 14.1 is offset from the projection 14.2 by a distance d in a direction parallel to the longitudinal direction of the vehicle. The projections 14.1, 14.2 shown in FIG. 1 are only two of a plurality of projections distributed in the y direction over the installation surface to define a first subset of projections arranged at the front of the air-directing component 10 in the direction of travel, and a second subset offset to the rear by a distance d on the installation surface 18. A further configuration provides that a projection 14.2 from the second subset follows in the y direction a projection 14.1 from the first subset, thus resulting in an alternating arrangement of the projections. The recesses 16.1, 16.2 are disposed in positions corresponding to the projections 14.1, 14.2. Additionally, the locking flanges 17f on the more forward projections 14.1 project forward from the support legs 17l, whereas the locking flanges 17f on the more rearward projections 14.2 project rearward from the support legs 17l. Accordingly, rear edges of the more forward recesses 16.1 extend linearly in the y direction from the entry region 22 to the locking region 24, whereas a step is defined along the front edges of the more forward recesses 16.1 between the entry region 22 and the locking region 24. Conversely, front edges of the more rearward recesses 16.2 extend linearly in the y direction from the entry region 22 to the locking region 24, whereas a step is defined along the rear edges of the more rearward recesses 16.1 between the entry region 22 and the locking region 24. The opposite orientation of the locking flanges 17f on the front projections 14.1 versus the rear projections 14.2 provides more secure retention the air-directing component 10.

The alternating arrangement of the projections 14.1, 14.2 results in an expansion that enables force to be absorbed both in the direction of travel (counter to the x direction) and also counter to the direction of travel, i.e. in the x direction.

The air-directing component 10 has a relatively rigid part 30 that is connected fixedly to a relatively flexible part 32, as illustrated in FIG. 1. The relatively rigid part 30 is provided for the fastening the air-directing component 10 to the front end 12 and is more rigid than the second relatively flexible part 32. The relatively rigid part 30 may be polypropylene and defines a load-bearing fastener that withstands even high driving wind loads. The relatively flexible part 32 may be a thermoplastic elastomer and increases the "hardening gradient". Thus, slight contact with obstacles, such as curbstones, is not likely to cause damage.

Figure 2:
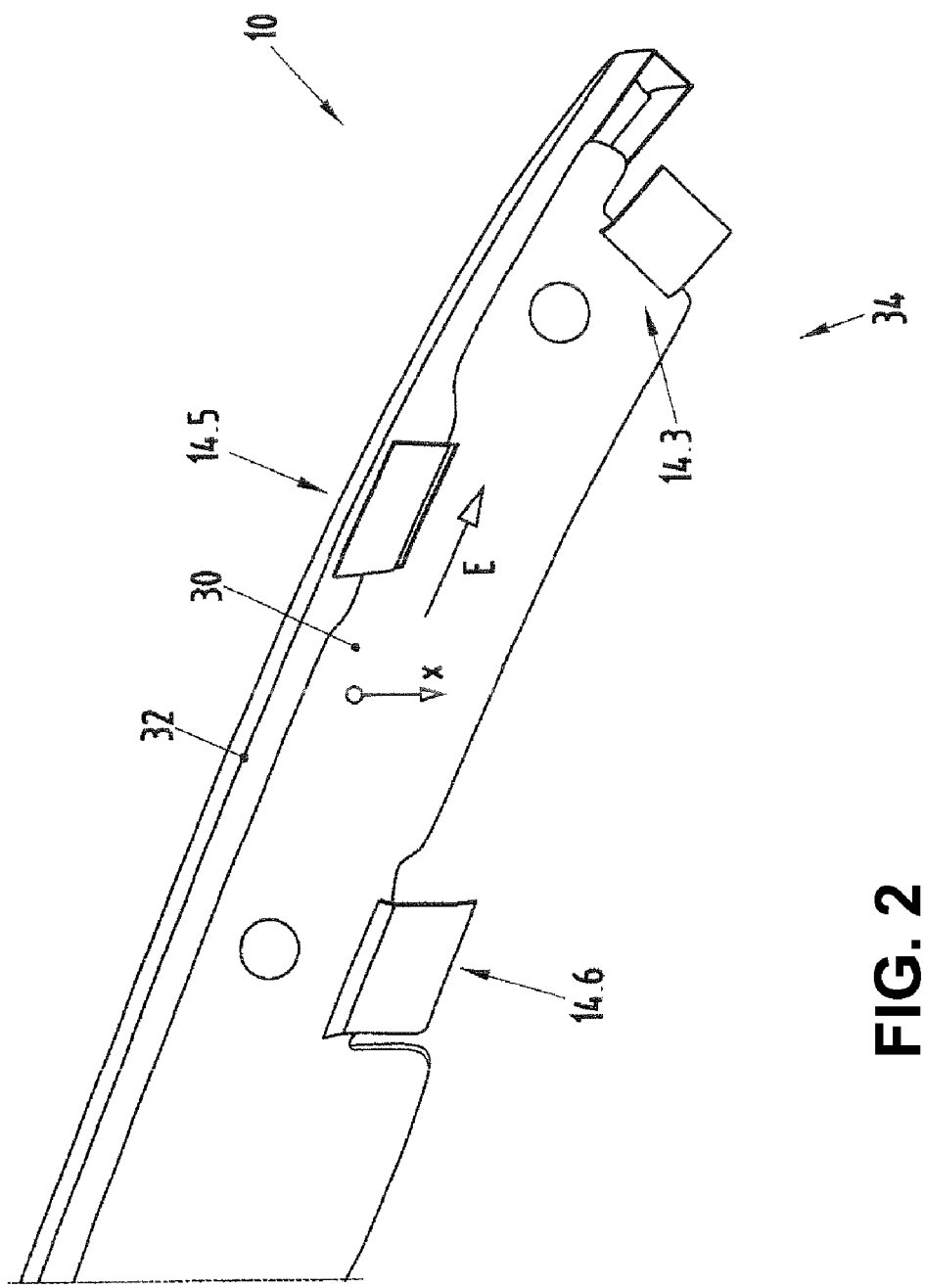
FIG. 2 is a top plan view of a first end region of the air directing component.

FIG. 2 shows a first lateral end region 34 of a configuration of an air-directing component 10, in which a projection 14.3 in the first lateral end region 34 is oriented transversely with respect to the pushing-in direction E and forms a stop for the pushing-in operation, which takes place transversely with respect to the longitudinal direction of the vehicle (counter to the x direction). Further projections 14.5 and 14.6 correspond in their shape and function to the projections 14.1 and 14.2 of FIG. 1 and essentially differ from the projections 14.1 and 14.2 of FIG. 1 only by their arrangement and dimensions. Furthermore, the same reference numbers in the figures each refer in terms of their function to the same elements, even if the dimensions and arrangement differ.

Figure 3:
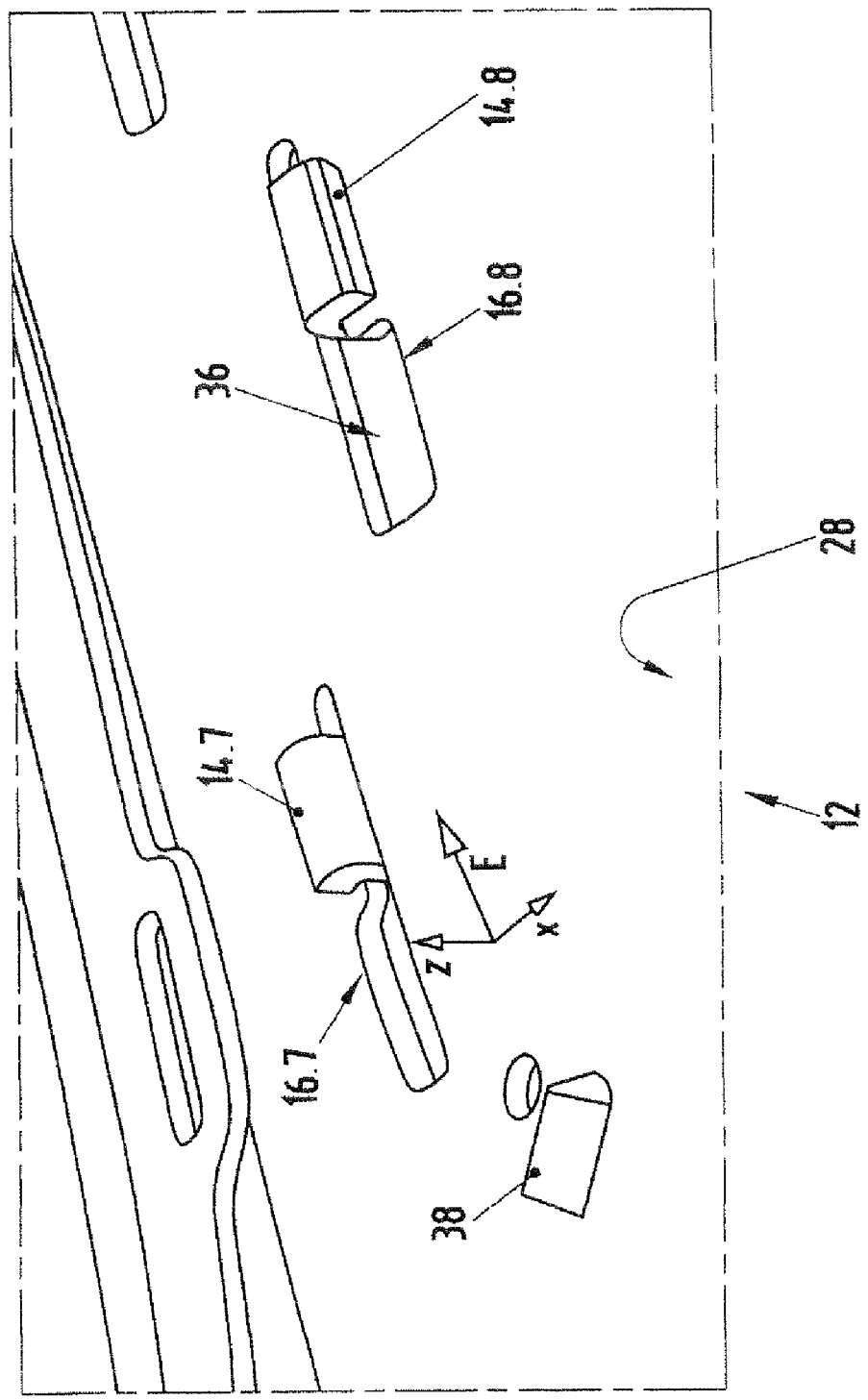
FIG. 3 is a top view of an inner side of the body front end with a second end region of the air-directing component lying opposite the first end region in the fitted state.

FIG. 3 shows a top view of an inner side 28 of the body front end 12 with a second end region 36 of the air-directing component 10 lying opposite the first end region 34 in the fitted state. The second end region 36 has a latching lug 38 that engages behind an edge of the front end 12 in the fitted state of the air-directing component 10. The relatively rigid first part 30 of the air-directing component 10 has a predetermined bending point that permits the latching lug 38 to be pivoted substantially in the z direction into the front end 12 without being destroyed.

Projections 14.7 and 14.8 correspond in shape and function to the projections 14.1 and 14.2 of FIG. 1 and essentially differ from the projections 14.1 and 14.2 of FIG. 1 only in their arrangement and dimensions.

FIG. 3 also shows how, in the fitted state, each projection 14.7, 14.8 reaches through the recess 16.7, 16.8 and engages behind an edge of the associated recess 16.7, 16.8 on the inner side 28 of the front end 12.

What is claimed is:

1. A motor vehicle, comprising a body front end having opposite outer and inner surfaces, front and rear recesses being formed through the body front end from the outer surface to the inner surface, the front recesses being more forward than the rear recesses and being spaced from one another in directions transverse to the longitudinal axis, edges being formed on the inner surface at each of the recesses, and an air-directing component having an installation surface configured to bear against the outer surface of the body front end, front and rear hook-shaped projections protruding from the installation surface, the front and rear hook-shaped projections being disposed and dimensioned to be pushed into the respective front and rear recesses in the body front end of the motor vehicle, the hook-shaped projections being configured to reach through the respective recess and engage the inner surface of the body front end adjacent the edge of the respective recess, and the projections being configured and arranged relative to the recesses for permitting the projections to be pushed transversely with respect to a longitudinal axis of the motor vehicle into the recesses, a transverse projection provided in a first lateral end region of the air-directing component and being oriented transversely with respect to a pushing-in direction, the transverse projection forming a stop for a pushing-in operation that takes place transverse to the longitudinal direction of the vehicle and a latching lug being provided at a second lateral end region that is opposite the first lateral end region, said latching lug engaging behind an edge of the front end in a fitted state of the air-guiding component.

2. The motor vehicle of claim 1, characterized in that the air-directing component comprises a relatively rigid part fixedly connected to a relatively flexible part.

3. An air directing assembly for a motor vehicle, the motor vehicle having a longitudinal axis, the assembly comprising:
   a body front end having opposite outer and inner surfaces, recesses passing through the body front end from the outer surface to the inner surface, edges being defined on the inner surface at the recesses, each of the recesses having an entry region and a locking region adjacent to the entry region in a direction transverse to the longitudinal axis of the vehicle, the locking region being narrower than the entry region in directions parallel to the longitudinal axis; and
   an air-directing component having an installation surface bearing against the outer surface of the body front end, projections protruding from the installation surface of the air-directing component, each of the projections having a support leg protruding from the installation surface and a locking flange protruding from the support leg at a position spaced from the installation surface so that each of the projections is substantially L-shaped, a first plurality of the projections having the locking flanges thereof projecting forwardly and a second plurality of the projections having the locking flanges thereof projecting rearwardly, the support leg and the locking flange being dimensioned to pass through the entry regions of the respective recesses, the support leg being dimensioned to be disposed in the locking region of the respective recess the locking flange of each projection being larger than the locking region of the respective recess and being configured to engage the inner surface of the body front end adjacent the edge of the recess and the projections being moveable in the recesses transverse to the longitudinal axis of the motor vehicle.

4. The assembly of claim 3, wherein a transition from the entry region to the locking region is defined by a single step.

5. The assembly of claim 3, in that the transition from the entry region to the locking region defines a ramp.

6. The assembly of claim 3, wherein the support legs of the first plurality of the projections lie substantially in a first plane and the support legs of the second plurality of the projections lie substantially in a second plane, the first and second planes being substantially parallel.

7. The assembly of claim 6, wherein the first and second planes are substantially perpendicular to the longitudinal axis of the vehicle.

8. The assembly of claim 3, wherein the projections are offset from one another in directions transverse to the longitudinal axis of the motor vehicle.

9. The assembly of claim 3, wherein the air directing component includes a plate formed from a first material and a front spoiler attached to the plate, projections extending from the plate, the plate being formed from a material that is more rigid than the front spoiler.

10. A motor vehicle comprising a body front end having opposite outer and inner surfaces, front and rear recesses being formed through the body front end from the outer surface to the inner surface, the front recesses being more forward than the rear recesses and being spaced from one another in directions transverse to the longitudinal axis, edges being formed on the inner surface at each of the recesses, and an air-directing component having an installation surface configured to bear against the outer surface of the body front end, front and rear hook-shaped projections protruding from the installation surface, the front and rear hook-shaped projections being disposed and dimensioned to be pushed into the respective front and rear recesses in the body front end of the motor vehicle, the hook-shaped projections being configured to reach through the respective recess and engage the inner surface of the body front end adjacent the edge of the respective recess, and the projections being configured and arranged relative to the recesses for permitting the projections to be pushed transversely with respect to a longitudinal axis of the motor vehicle into the recesses, wherein each of the hook-shaped projections is substantially L-shaped and is defined by a support leg projecting from the installation surface and a locking flange projecting from a location on the support leg remote from the installation surface, the locking flanges of the front hook-shaped projections projecting forwardly from the respective support legs and the locking flanges of the rear hook-shaped projections projecting rearwardly from the respective support legs.

* * * * *